United States Patent
Shih

(10) Patent No.: US 10,857,937 B1
(45) Date of Patent: Dec. 8, 2020

(54) STEERING LIGHT ASSEMBLY

(71) Applicant: T.Y.C. BROTHER INDUSTRIAL CO., LTD., Tainan (TW)

(72) Inventor: Ming-Chih Shih, Tainan (TW)

(73) Assignee: T.Y.C. BROTHER INDUSTRIAL CO., LTD., Tainan (TW)

( * ) Notice: Subject to any disclaimer, the term of this patent is extended or adjusted under 35 U.S.C. 154(b) by 0 days.

(21) Appl. No.: 16/441,523

(22) Filed: Jun. 14, 2019

(51) Int. Cl.
| | |
|---|---|
| *F21S 8/10* | (2006.01) |
| *B60Q 1/14* | (2006.01) |
| *B60Q 1/34* | (2006.01) |
| *F21S 43/20* | (2018.01) |
| *B60Q 1/40* | (2006.01) |
| *F21S 43/15* | (2018.01) |
| *F21S 41/148* | (2018.01) |

(52) U.S. Cl.
CPC ............... *B60Q 1/346* (2013.01); *B60Q 1/40* (2013.01); *F21S 41/148* (2018.01); *F21S 43/15* (2018.01); *F21S 43/20* (2018.01)

(58) Field of Classification Search
CPC .. B60Q 1/346; B60Q 1/40; F21S 43/20; F21S 43/15; F21S 41/148
See application file for complete search history.

(56) References Cited

U.S. PATENT DOCUMENTS

| | | | |
|---|---|---|---|
| 2003/0142502 A1* | 7/2003 | Kawai | B62J 6/02 362/475 |
| 2013/0241413 A1* | 9/2013 | Ooba | B60Q 1/18 315/82 |
| 2014/0313762 A1* | 10/2014 | Owada | B60Q 1/0088 362/538 |
| 2018/0118093 A1* | 5/2018 | Yamazumi | F21S 41/635 |
| 2018/0252381 A1* | 9/2018 | Kitayama | F21S 41/16 |

FOREIGN PATENT DOCUMENTS

| | | | |
|---|---|---|---|
| JP | 2019119439 A | * | 7/2019 |
| WO | WO-2019-064797 | * | 4/2019 |

OTHER PUBLICATIONS

WO2019064797 Combination Lightmachine Translation Apr. 2019 (Year: 2019).*
Jp-2019-11943, Jul. 2019, Machine Translation (Year: 2019).*

* cited by examiner

*Primary Examiner* — Tracie Y Green
(74) *Attorney, Agent, or Firm* — Burris Law, PLLC

(57) ABSTRACT

A steering light device is mounted on left or right sides of a motorcycle having an imaginary middle vertical plane extending horizontally in a front-rear direction. The steering light device includes a light unit and a lens unit. The light unit includes at least one inclined elongate auxiliary light descending inwardly toward the imaginary middle vertical plane. The lens unit includes at least one auxiliary lens cooperating respectively with the main and auxiliary lights to project light for compensating light intensity of a dark area in a road surface located in front of the motorcycle when steering the motorcycle to a corresponding one of the left or right.

8 Claims, 12 Drawing Sheets

STEERING LIGHT ASSEMBLY

FIELD

The disclosure relates to a light assembly, more particularly to a steering light assembly to be mounted on one of left and right sides of a motorcycle.

BACKGROUND

Referring to FIG. 1, the left half portion of FIG. 1 shows a light beam shape formed by cornering lights of a motorcycle traveling upright on the ground. When the motorcycle is turning, for example, right and is inclined relative to the ground, the light beam shape on a road area in front of the motorcycle illuminated by the cornering lights changes into that shown in the right half portion of FIG. 1. As can be seen, a dark area 11 is not illuminated by the cornering lights and light intensity at the dark area 11 is insufficient for a user to clearly see the road surface.

Referring to FIG. 2, a conventional steering light device 10 is shown to be mounted at one side of a main light source 12 of a motorcycle. The conventional steering light device 10 includes a substantially arc-shaped reflective mirror 13 and a halogen lamp 14 disposed inside the reflective mirror 13 for emitting light to compensate light intensity of a dark area in front of the motorcycle. However, the conventional steering light device 10 is not integrated with the main light source 12 and thus occupies a relatively large room. Additionally, the halogen lamp 14 cannot provide a suitable illuminated area on a road according to an inclination angle of the motorcycle relative to the ground.

SUMMARY

Therefore, an object of the present disclosure is to provide a steering light device for compensating light intensity of a dark area in a road surface in front of a motorcycle when steering the motorcycle to one of the left and right.

According to one aspect of the present disclosure, a steering light device adapted to be mounted on one of left and right sides of a motorcycle having an imaginary middle vertical plane that extends horizontally in a front-rear direction is provided. The steering light device includes a base unit, a light emitting unit and a lens unit. The light emitting unit includes a main light source set and at least one elongated auxiliary light source set that are disposed on the base unit and that project light forwardly. The at least one auxiliary light source set includes a lower end and a top end, is inclined relative to a horizontal line extending in a left-right direction transverse to the front-rear direction and descends inwardly from the top end toward the lower end.

The lens unit includes a main lens set and at least one auxiliary lens set. The main lens set cooperates with the main light source set to project light forwardly to form one of a high beam pattern and a low beam pattern. The at least one auxiliary lens set is disposed in front of the at least one auxiliary light source set in the front-rear direction, is connected integrally to the main lens set, extends forwardly from the auxiliary light source set, and includes a curved light exit face adapted to extend forwardly away from the imaginary middle vertical plane and the auxiliary light source set for compensating light intensity of a dark area in a road surface located in front of the motorcycle when steering the motorcycle to a corresponding one of the left and right.

According to another aspect of the present disclosure, a steering light device is adapted to be mounted on one of left and right sides of a motorcycle having an imaginary middle vertical plane that extends horizontally in a front-rear direction. The steering light device includes a base unit, a light emitting unit and a lens unit. The light emitting unit includes a plurality of elongated auxiliary light source sets disposed on the base unit and projecting light. Each of the auxiliary light source sets includes a lower end and a top end, and is inclined relative to a horizontal line extending in a left-right direction and descending inwardly from the top end toward the lower end. The lens unit includes a plurality of auxiliary lens sets that are respectively disposed in front of the auxiliary light source sets in the front-rear direction. Each of the auxiliary lens sets extends forwardly away from the respective one of the auxiliary light source sets in the front-rear direction, and includes a curved light exit face that is disposed at a front end thereof and that is adapted to extend forwardly away from the imaginary middle vertical plane and the respective one of the auxiliary light source sets for compensating light intensity of a dark area in a road surface located in front of the motorcycle when steering the motorcycle to a corresponding one of the left or right.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
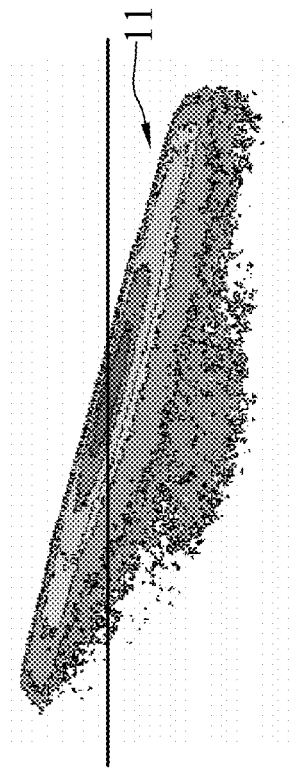
FIG. 1 is a schematic view illustrating light beam patterns of a conventional steering light device.
Figure 1:
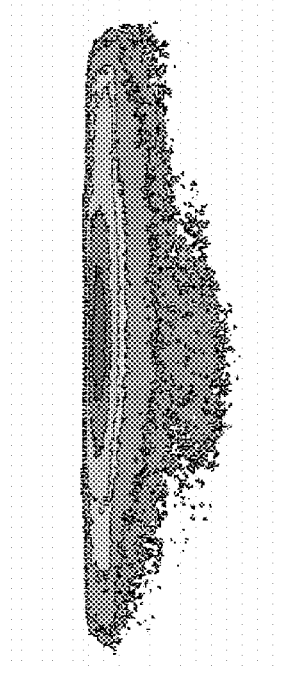
Figure 2:
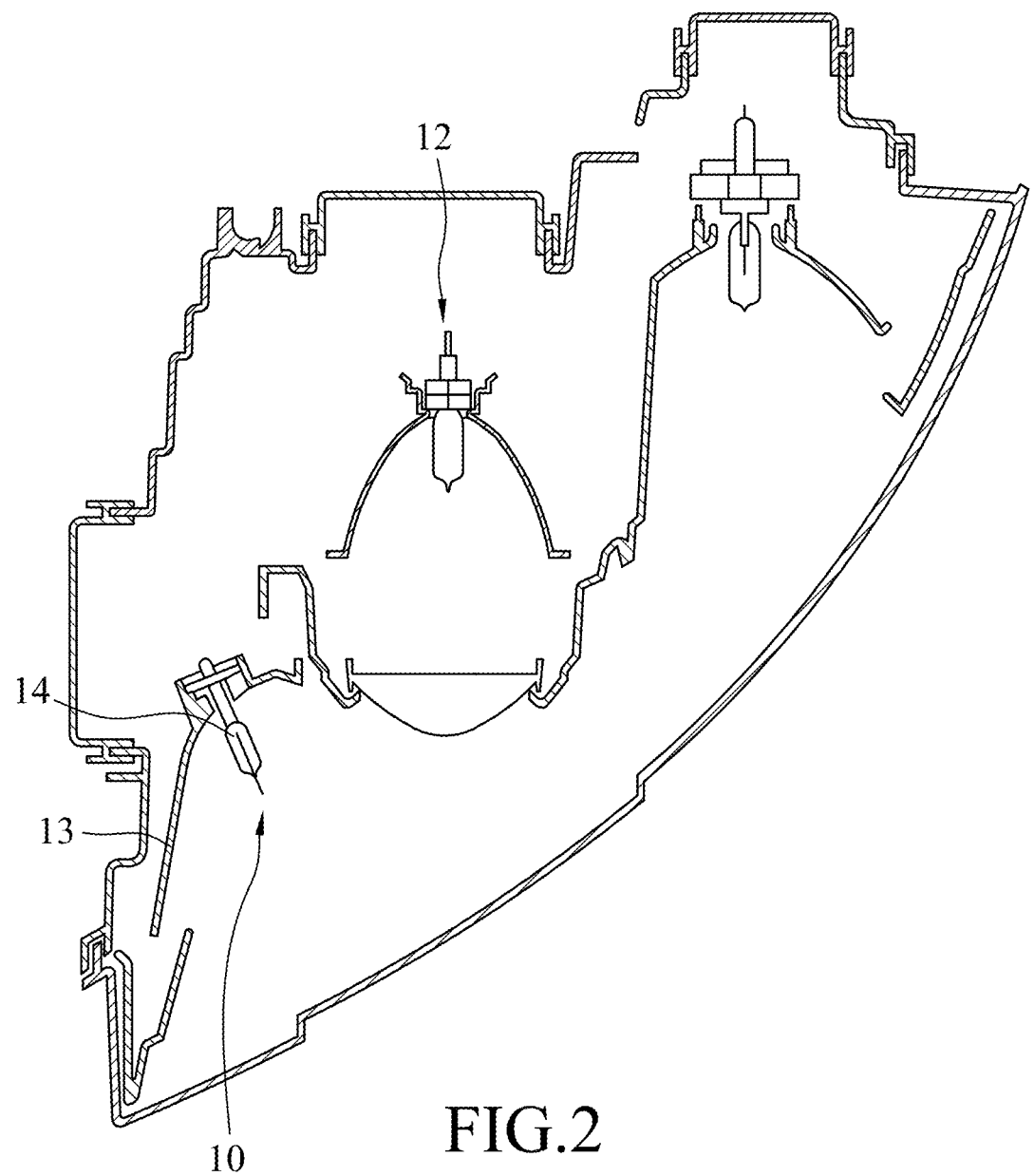
FIG. 2 is a schematic cross-sectional view of the conventional steering light device.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 3-6, a steering light device is mounted on a right side of a motorcycle (not shown) according to a first embodiment of the present disclosure is shown. The motorcycle has an imaginary middle vertical plane (L1) extending in a front-rear direction (D1) of the motorcycle. In the following description, a position of a user of the motorcycle at which the imaginary middle vertical plane (L1) is located is taken as a reference point for defining the front-rear direction, and a direction toward the imaginary middle vertical plane (L1) is referred to as an inward direction and a direction away from the imaginary middle vertical plane (L) is referred to as an outward direction.

The steering light device includes a base unit 2, a light emitting unit 3, and a lens unit 4.

It should be noted that a person having ordinary skill in the pertinent art can easily modify the steering light device disclosed in the following description to a structure suitable for being mounted on a left side of the motorcycle.

The base unit 2 includes a heat dissipating seat 21 and a heat dissipating plate 22 disposed in front of the heat dissipating seat 21 in the front-rear direction (D1). The heat dissipating seat 21 is substantially inverted L-shaped and includes a long portion extending in a left-right direction (D2) transverse to the front-rear direction (D1), i.e., a left-right direction in FIG. 3, and a short portion extending in a vertical direction (D3) transverse to the front-rear direction (D1) and the left-right direction (D2), i.e., a vertical direction in FIG. 3. In this embodiment, the heat dissipating set 21 is made of metal and includes a plurality of fin structures capable of dissipating heat generated by the light emitting unit 3. The heat dissipating plate 22 is also made of metal, is secured on the heat dissipating seat 21 by, for example, a plurality of nuts and bolts, and has a profile the same as that of the L-shaped heat dissipating seat 21 whereas the thickness of the heat dissipating plate 22 in the front-rear direction (D1) is smaller than that of the heat dissipating seat 21.

The light emitting unit 3 includes a main light source set 31 and an elongated auxiliary light source set 32 that are disposed on the base unit 2 and that project light forwardly. The main light source set 31 includes two elongate main light sources 311 spaced apart from each other in the left-right direction (D2) and disposed on the heat dissipating plate 22. Each of the main light sources 311 has an optical axis extending in the front-rear direction (D1), and is configured as a rectangular light-emitting diode (LED) die that has vertically opposite long sides extending in the left-right direction (D2).

Figure 6:
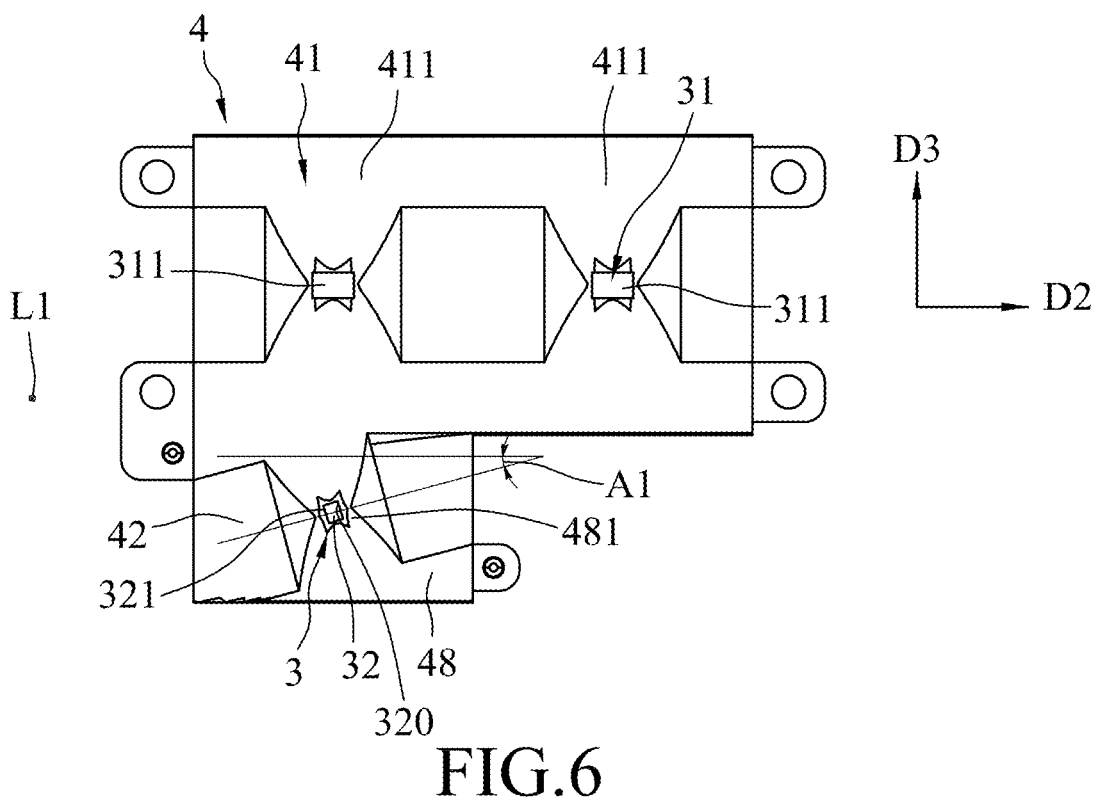
FIG. 6 is a schematic rear view of the first embodiment, illustrating structural relationship among two main light source sets and an auxiliary light source set.

The auxiliary light source set 32 also has an optical axis extending in the front-rear direction (D1), is disposed under a left one of the main light sources 311 in the vertical direction (D3), and is configured as a rectangular LED die that has opposite long sides extending in a direction inclined relative to the left-right direction (D2). Specifically, as shown in FIG. 6, the auxiliary light source set 32 is inclined relative to a horizontal line extending in the left-right direction (D2), includes a top end 320 and a lower end 321 disposed lower than the top end 320 in the vertical direction (D3) when the motorcycle travels upright (i.e., when in a normal state), and descends inwardly from the top end 320 toward the lower end 321. In this embodiment, an included angle (A1) between the auxiliary light source set 32 and the horizontal line is 15 degrees. The included angle (A1) may range from 10 degrees to 50 degrees in other embodiments of the present disclosure.

The lens unit 4 is mounted in front of the base unit 2 and the light emitting unit 3 in the front-rear direction (D1) by, for example, a plurality of nuts and bolts. The lens unit 4 includes a main lens set 41 and an auxiliary lens set 42. The main lens set 41 includes two main lenses 411 being arranged side-by-side in the left-right direction (D2), integrally connected to each other, and cooperating respectively with the main light sources 311 to project light forwardly to cooperatively form a high beam pattern or a low beam pattern. Since how the main lens sets 41 cooperate respectively with the light sources 311 to form different beam patterns is well known, details of the same are omitted for the sake of brevity.

The auxiliary lens set 42 is disposed in front of the auxiliary light source set 32 in the front-rear direction (D1), is connected integrally to the main lens set 41 and extends forwardly from the auxiliary light source set 32. The auxiliary lens set 42 includes a light exit face 43, an upper rim 44, a lower rim 45, an inner rim 46 and an outer rim 47 and a rear end surface 48. The upper rim 44, the lower rim 45, the inner rim 46 and the outer rim 47 cooperate with one another to define the light exit face 43. The light exit face 43 is curved, is disposed at a front end of the auxiliary lens set 42, and is adapted to extend forwardly away from the imaginary middle vertical plane (L1) and the auxiliary light source set 32 for compensating light intensity of a dark area in a road surface located in front of the motorcycle when steering the motorcycle to the right. Note that for the mirrored structure of the steering light device of the present disclosure to be mounted on a left side of the motorcycle, the light exit face 43 is provided for compensating light intensity of a dark area in the road surface when steering the motorcycle to the left.

The upper rim 44 extends forwardly, outwardly and curvedly away from the imaginary middle vertical plane (L1) and has an inner upper end 441 that is proximate to the imaginary middle vertical plane (L1) in the left-right direction (D2) and that is proximate to the auxiliary light source set 32 in the front-rear direction (D1), and an outer upper end 442 that is opposite to the inner upper end 441, that is away from the imaginary middle vertical plane (L1) in the left-right direction (D2), and that is away from the auxiliary light source set 32 in the front-rear direction (D1).

The lower rim 45 is opposite to the upper rim 44 in the vertical direction, extends forwardly and curvedly away from the imaginary middle vertical plane (L1) and has an inner lower end 451 that is proximate to the imaginary middle vertical plane (L1) in the left-right direction (D2) and that is proximate to the auxiliary light source set (32) in the front-rear direction (D1), and an outer lower end (452) that is away from the imaginary middle vertical plane (L1) in the left-right direction (D2) and that is away from the auxiliary light source set 32 in the front-rear direction (D1). The inner lower end 451 is in front of the inner upper end 441 in the front-rear direction (D1). The outer lower end 452 is behind the outer upper end 442 in the front-rear direction (D1).

The inner rim 46 has a curvature greater than that of the outer rim 47. The outer rim 47 is disposed in front of the inner rim 46 in the front-rear direction (D1). The rear end surface 48 of the auxiliary lens set 42 is formed with a recess 481 corresponding in position to the auxiliary light source set 32 in the front-rear direction (D1) to serve as a light incident portion of the auxiliary lens set 42.

Figure 7:
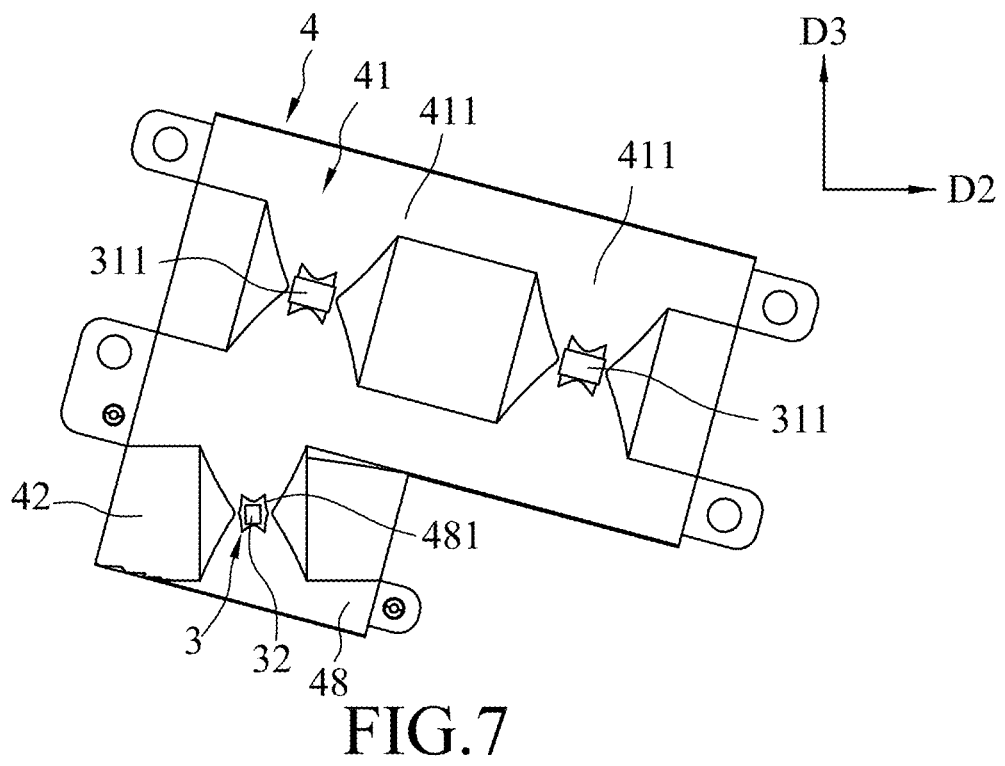
FIG. 7 is a schematic rear view similar to FIG. 6, illustrating the steering light device when inclined relative to a horizontal line during steering of the motorcycle to the right.
Figure 8:
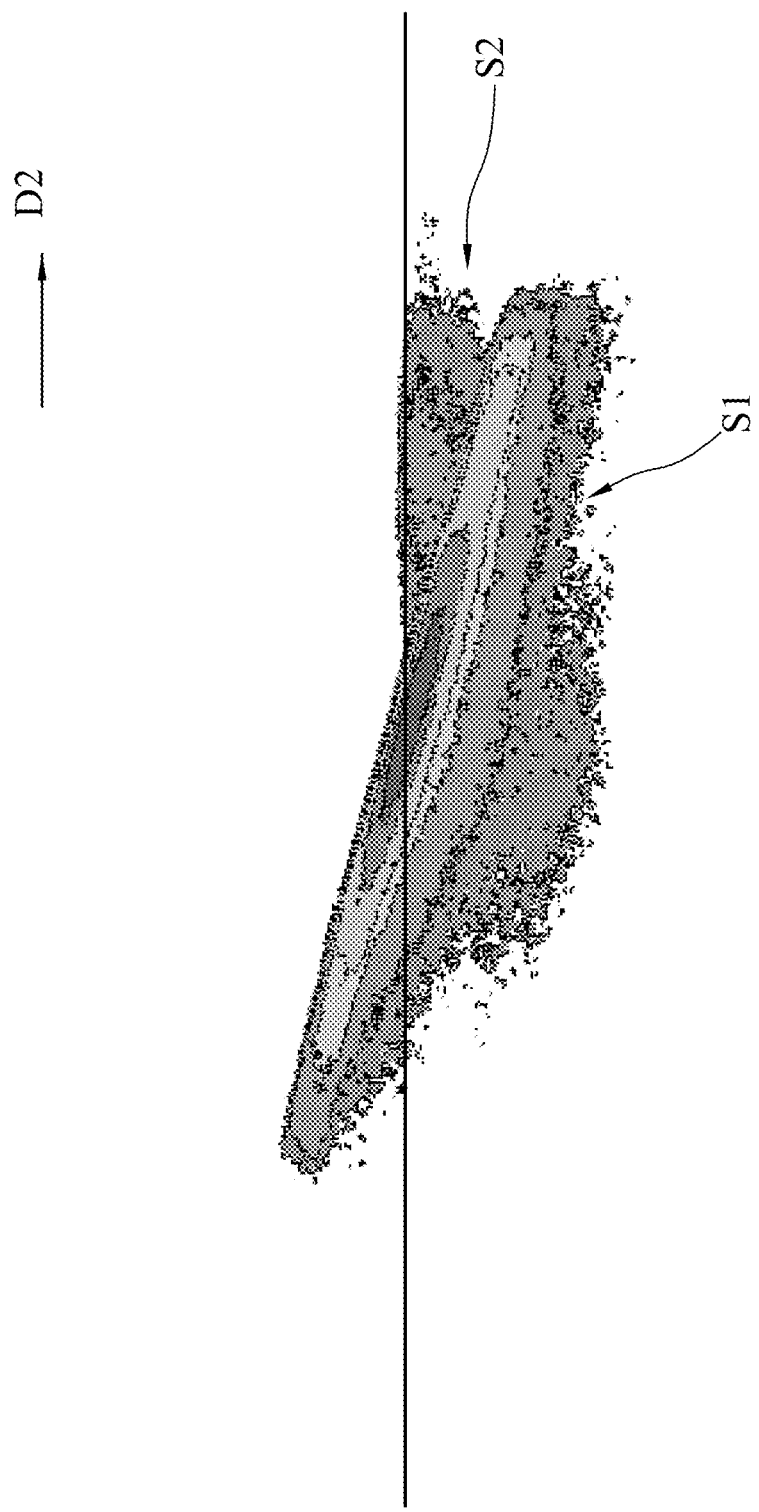
FIG. 8 is a schematic view illustrating a first light beam pattern formed by the main light source sets and the auxiliary light source set of the first embodiment when the motorcycle is steered to the right.

FIG. 6 depicts a rear view of the steering light device of the first embodiment when the motorcycle in a normal state and is traveling straight without leaning, i.e., the motorcycle is traveling upright on the ground. Further referring to FIG. 7, another rear view of the first embodiment depicts the motorcycle being in an inclined state and inclined relative to the ground at approximately 15 degrees. At this time, the main light sources 311 are inclined relative to the horizontal line and cooperate with the main lens set 41 to form a main light shape (S1) shown in FIG. 8 and the auxiliary light source set 32 is parallel to the horizontal line and cooperates with the auxiliary lens set 42 to form a steering light shape (S2).

The auxiliary light set 32 is designed to be inclined relative to the horizontal line such that when the motorcycle mounted with the first embodiment is inclined relative to the ground, the auxiliary light set 32 cooperate with the auxiliary lens set 42 to form the steering light shape (S2) that extends substantially in the left-right direction (D2) to compensate light intensity of a dark area in front of the motorcycle. Additionally, the light exit face 43 extending in a specific manner as described above and defined by the upper rim 44, the lower rim 45, the inner rim 46 and the outer rim 47 is designed to illuminate the dark area in front of the motorcycle in a precise manner.

To sum up, the steering light device of the first embodiment provides illumination to compensate for light intensity of a dark area that cannot be illuminated clearly the conventional steering light device. Further, since the auxiliary light source set 32 and the main light source set 31 are both disposed on the heat dissipating plate 22 and since the auxiliary lens set 42 is integrally connected to the main lens set 41, the overall design of the steering light device is compact and thus occupies a relatively small room in an area for mounting a light device of the motorcycle.

Figure 3:
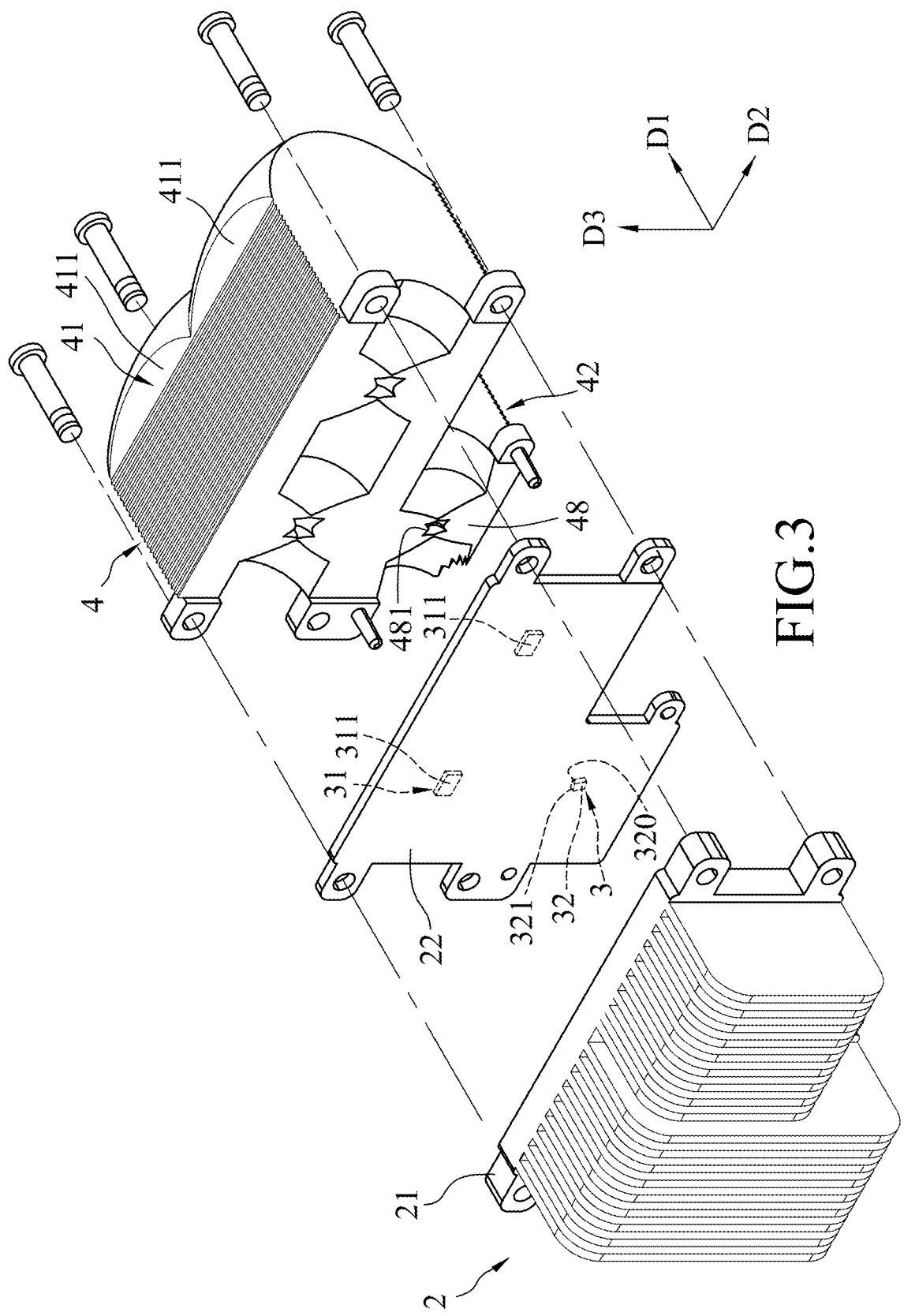
FIG. 3 is an exploded perspective view of a steering light device according to a first embodiment of the present disclosure, which is mounted on the right side of a motorcycle.
Figure 4:
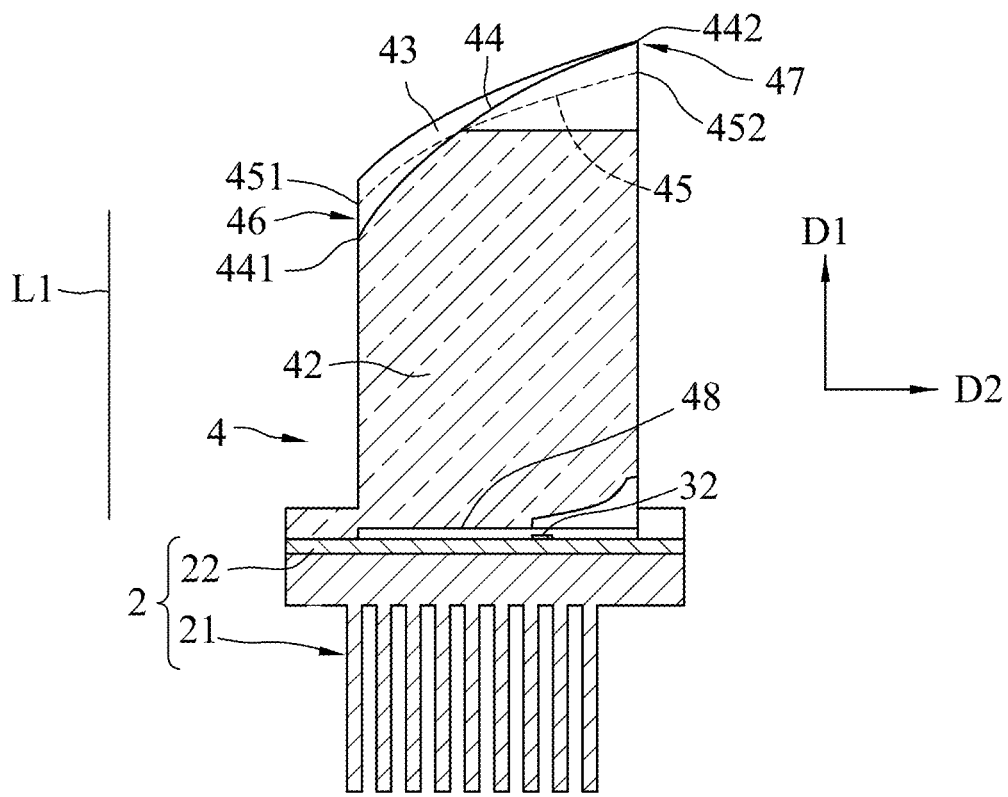
FIG. 4 is a sectional view of the steering light device of the first embodiment, illustrating structure of a lens unit of the first embodiment.
Figure 5:
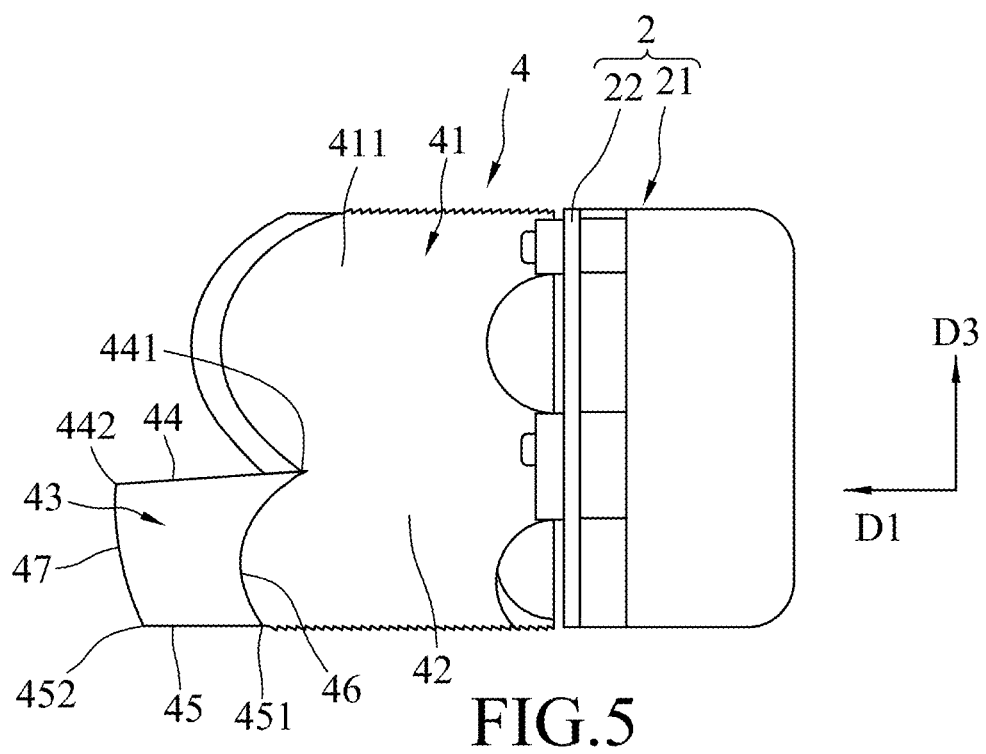
FIG. 5 is a schematic left-side view of the first embodiment.

Referring to FIGS. 9 to 12, the steering light device of a second embodiment according to the present disclosure is shown. The second embodiment is similar to the first embodiment, and the difference therebetween resides in the following. In the second embodiment, the heat dissipating seat 21 is configured as a cuboid extending in the left-right direction (D2) and the heat dissipating plate 22 has a rectangle profile the same as the heat dissipating seat 21. The main light source set 31 and the main lens set 41 shown in FIG. 3 are omitted, and the light emitting unit 3 includes three elongate auxiliary light source sets 32. The lens unit 4 includes three auxiliary lens sets 42 that are respectively disposed in front of the auxiliary light source sets 32 in the front-rear direction (D1). Each of the auxiliary lens sets 42 extends forwardly away from the respective one of the auxiliary light source sets 32 in the front-rear direction (D1). Note that as long as the number of the auxiliary light source sets 32 is the same as that of the auxiliary lens sets 42, the number of the auxiliary light source sets 32 and the auxiliary lens sets 42 are not limited to three.

Similar to the first embodiment, the imaginary middle vertical plane (L1) is taken as a reference for defining the front-rear direction, a side of the lens unit 4 proximate to the imaginary middle vertical plane (L1) is referred to as an inner side of the lens unit 4, and a side of the lens unit 4 distal from the imaginary middle vertical plane (L1) is referred to as an outer side of the lens unit 4. In this embodiment, the steering light device is mounted on the left side of the motorcycle. It should be noted that a person having ordinary skill in the pertinent art can easily modify the steering light device of the second embodiment disclosed in the following description to a suitable structure to be mounted on the right side of the motorcycle.

Each of the auxiliary light source sets 32 is inclined relative to the horizontal line and descends inwardly toward the imaginary middle vertical plane (L1). An included angle between each of the auxiliary light source sets 32 and the horizontal line ranges from 10 degrees to 50 degrees.

Figure 12:
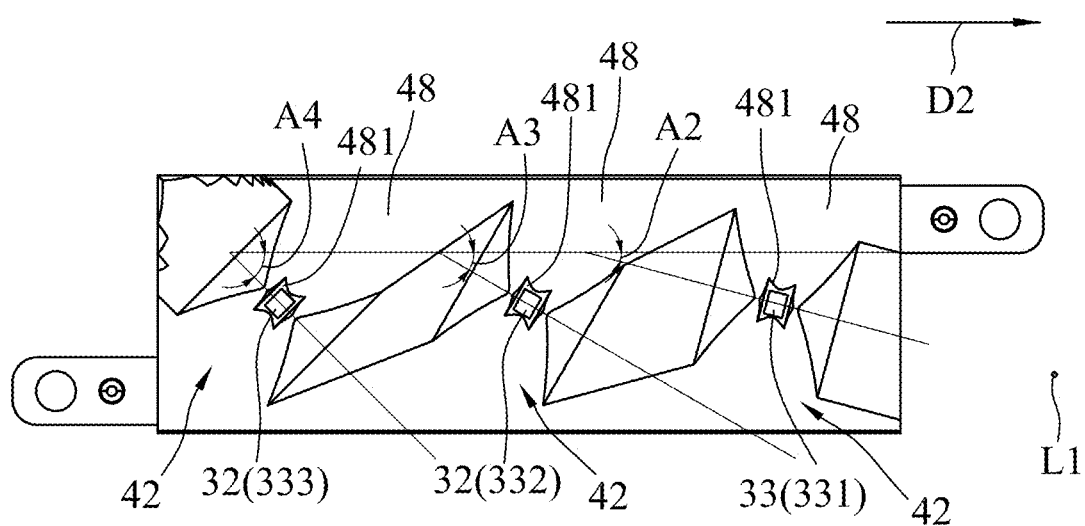
FIG. 12 is a schematic rear view illustrating structural relationship among the auxiliary lens sets and a plurality of auxiliary light sources of the second embodiment.

Specifically, as shown in FIG. 12, the auxiliary light source sets 32 respectively include a first auxiliary light source 331, a second auxiliary light source 332 and a third auxiliary light source 333 arranged from the right side to the left side in FIG. 12. An included angle (A2) between the first auxiliary light source 331 and the horizontal line is 15 degrees, an included angle (A3) between the second auxiliary light source 332 and the horizontal line is 30 degrees, and an included angle (A4) between the third auxiliary light source 333 and the horizontal line is 45 degrees.

Figure 9:
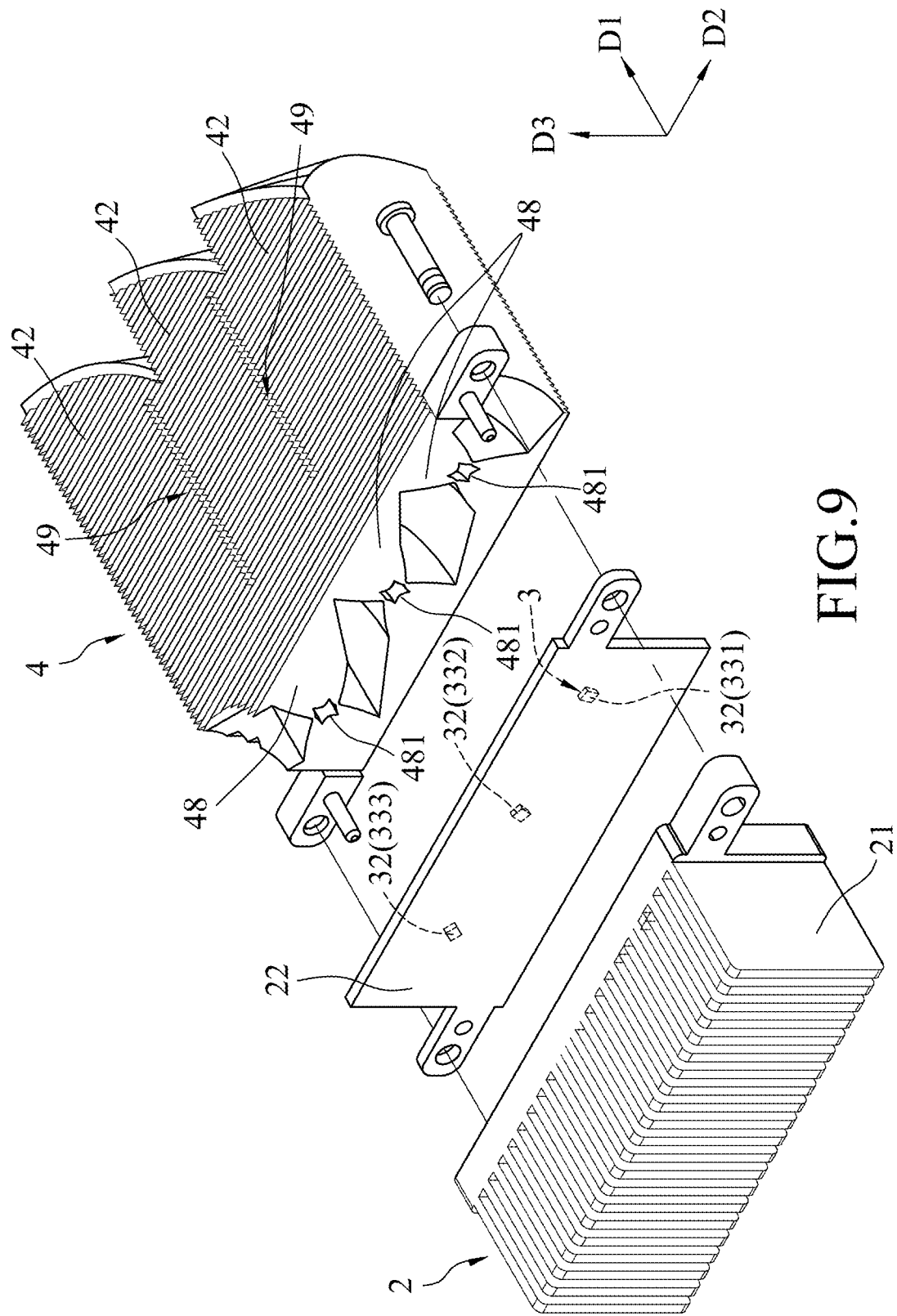
FIG. 9 is an exploded perspective view of a steering light device according to a second embodiment of the present disclosure, which is mounted on the left side of a motorcycle.
Figure 10:
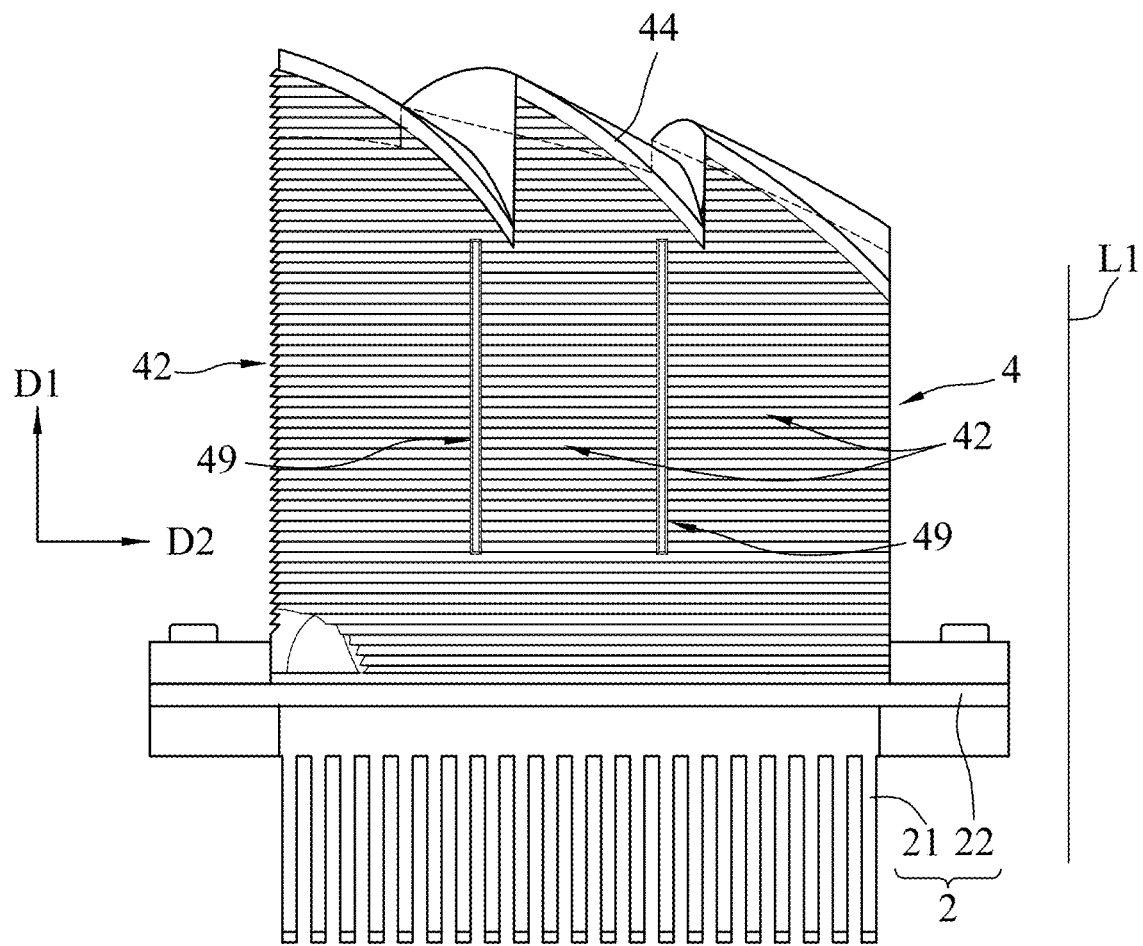
FIG. 10 is a schematic top view of the second embodiment, illustrating a plurality of auxiliary lens sets.
Figure 11:
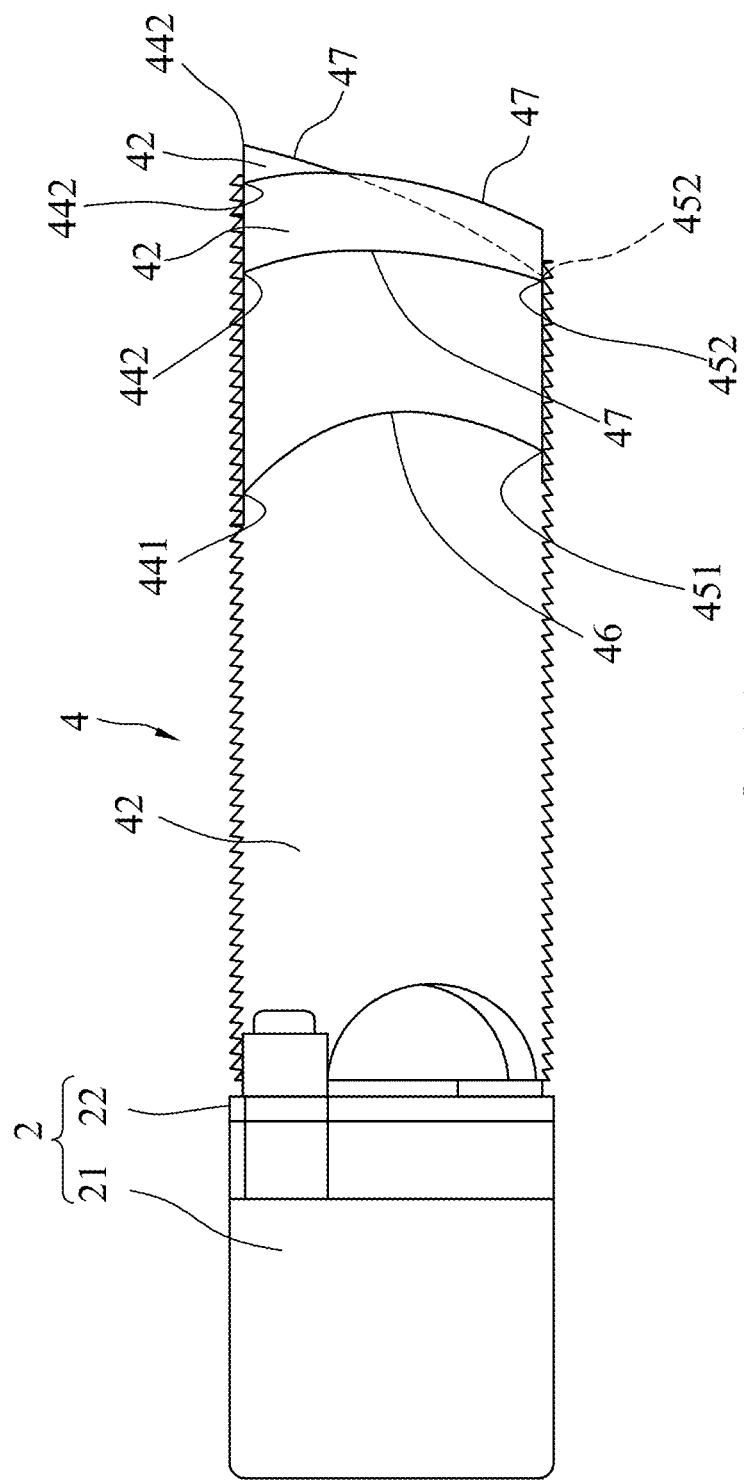
FIG. 11 is a schematic right-side view of the second embodiment.

As shown in FIGS. 9 and 10, since the structures of the auxiliary lens sets 42 are the same and since each of the auxiliary lens sets 42 is similar to that of the first embodiment, the details of the auxiliary lens sets 42 are not repeated herein for the sake of brevity. In this embodiment, the auxiliary lens sets 42 are connected integrally to one another and cooperate with one another to form two slots 49 each extending in the front-rear direction (D1) between adjacent two of the auxiliary lens sets 42 for preventing interference of light beams respectively emitted from the auxiliary light source sets 32 and respectively propagating in the auxiliary lens sets 42.

Figure 13:
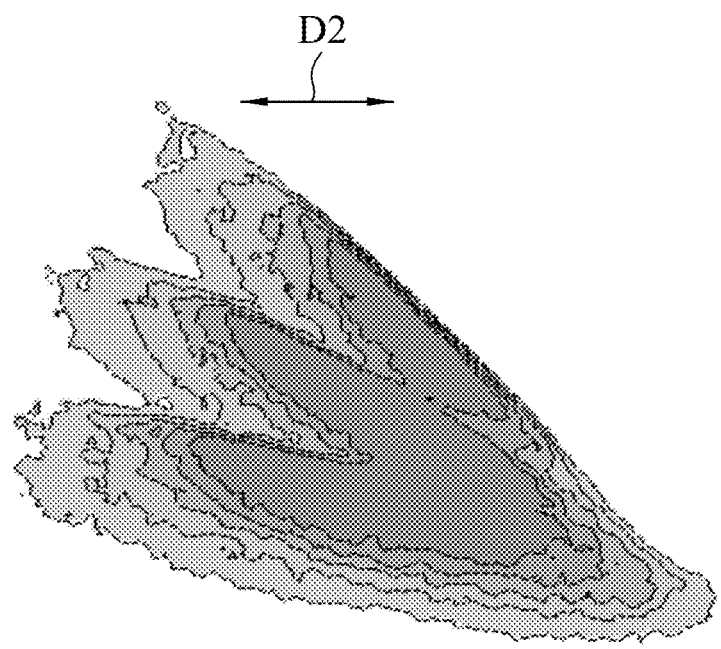
FIG. 13 is a schematic view of a light beam pattern formed by the second embodiment when the motorcycle travels straight.

FIG. 12 depicts a rear view of the steering light device of the second embodiment when the motorcycle is traveling straight in the normal state. FIG. 13 shows a light beam pattern formed by the auxiliary light source sets 32 when the motorcycle is in the normal state.

Figure 14:
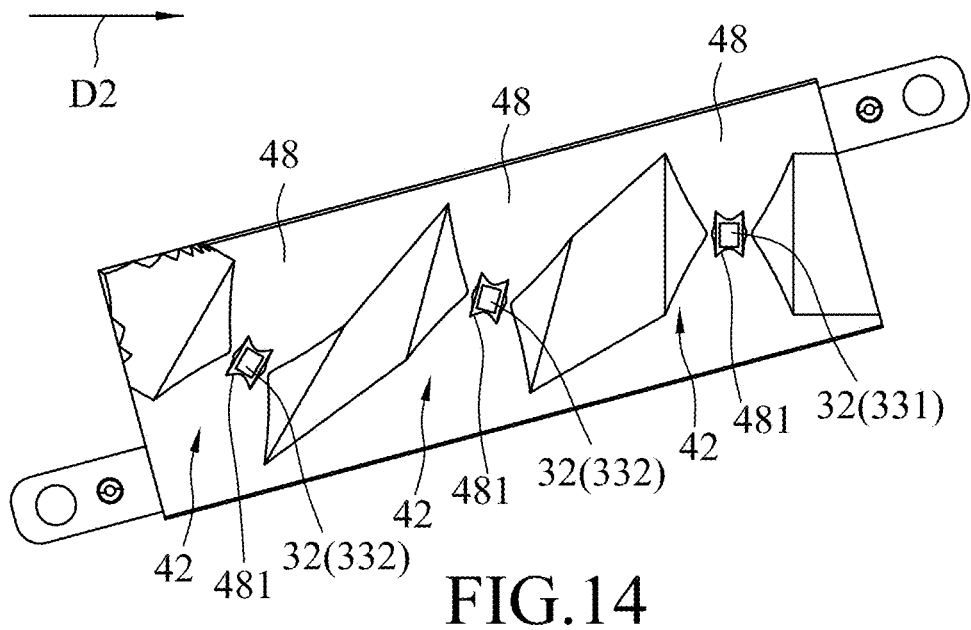
FIG. 14 is a rear view of the steering light device of the second embodiment, illustrating that the motorcycle is inclined to the left by 15 degrees.
Figure 15:
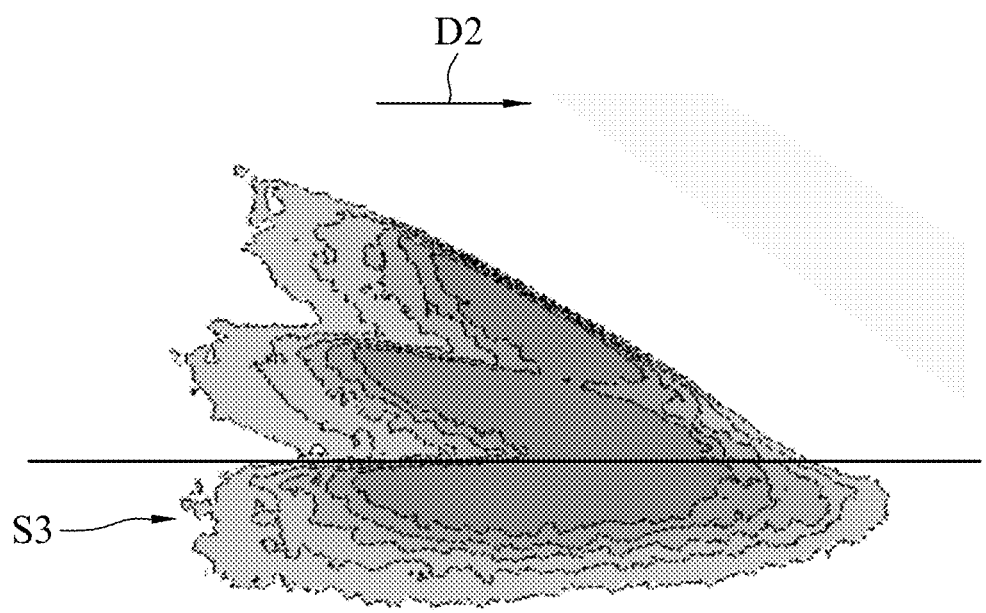
FIG. 15 is a schematic view of a second light beam pattern formed by the steering light device when the motorcycle is inclined to the left by 15 degrees.

FIG. 14 is a rear view of the steering light device of the second embodiment when the motorcycle is turning left and is thus inclined relative to the ground at approximately 15 degrees in a first inclined state where the long sides of the first auxiliary light source 321 are horizontal. FIG. 15 shows a light beam pattern formed by the steering light device of the second embodiment and a three-pronged light shape (S3) is formed by the first, second and third auxiliary light sources 331-333, and has a generally horizontal bottom prong for compensating for light intensity of a dark area of the road surface located in front of the motorcycle.

Figure 16:
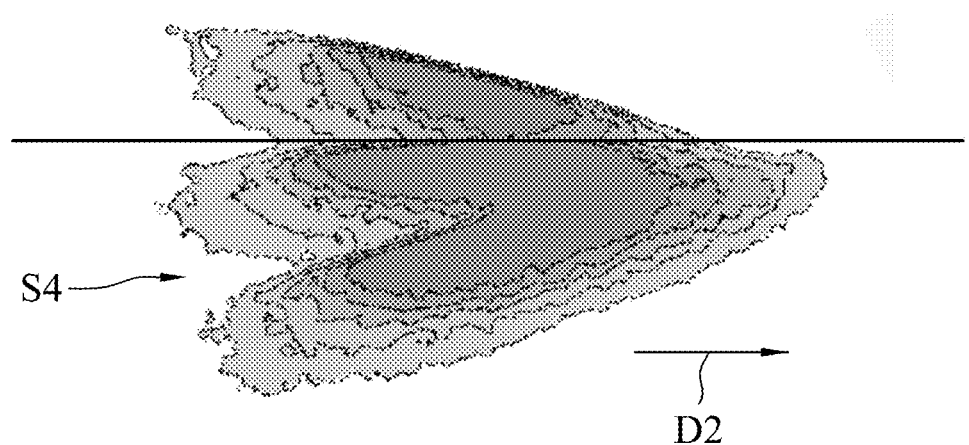
FIG. 16 is a schematic view of a third light beam pattern formed by the steering light device of the second embodiment when the motorcycle is inclined to the left by 30 degrees.

Further referring to FIG. 16, when the motorcycle is turning left and is thus inclined relative to the ground at approximately 30 degrees in a second inclined state where the long sides of the second auxiliary light source 332 are horizontal, a three-pronged light shape (S4) is formed by the first, second and third auxiliary light sources 331-333, and has a generally horizontal middle prong for compensating for light intensity of a dark area of the road surface located in front of the motorcycle.

Figure 17:
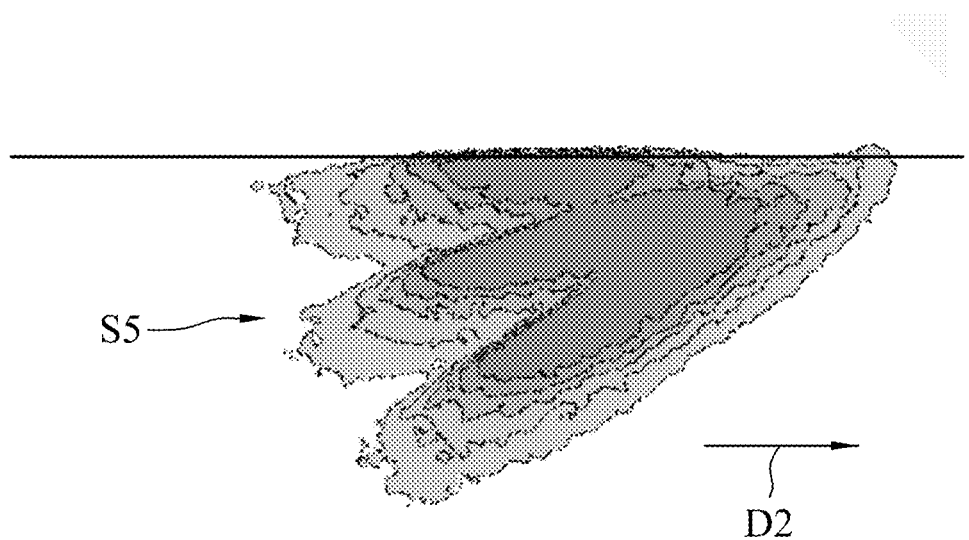
FIG. 17 is a schematic view of a fourth light beam pattern formed by the steering light device of the second embodiment when the motorcycle is inclined to the left by 45 degrees.

Further referring to FIG. 17, when the motorcycle is turning left and is thus inclined relative to the ground at approximately 45 degrees in a third inclined state where the long sides of the third auxiliary light source 333 are horizontal, a three-pronged light shape (S5) is formed by the first, second and third auxiliary light sources 331-333, and has a generally horizontal top prong for compensating for light intensity of a dark area of the road surface located in front of the motorcycle.

That is to say, when the motorcycle is steered and is inclined relative to the ground at 15 degrees, 30 degrees, or 45 degrees, a dark area in front of the motorcycle can be compensated for by the auxiliary light source sets 32 and thus the driving safety of the user steering the motorcycle equipped with the steering light device of the present disclosure may be improved.

It should be noted that, it can be designed such that only one of the first to the third auxiliary light sources 331-333 can emit light at a time. For example, when the motorcycle is in the first inclined state, the first auxiliary light source 331 provides illumination and the second and third auxiliary light sources 332, 333 do not emit light. Similarly, when the motorcycle is in the second inclined state, the second auxiliary light source 332 provides illumination and the first and the third auxiliary light sources 331, 333 do not emit light. As the motorcycle is in the third inclined state, the third auxiliary light source 333 emits light and the first and second auxiliary light sources 331, 332 do not emit light.

To sum up, by virtue of the configuration of the auxiliary light source sets 32 cooperating with the auxiliary lens sets 42, the steering light device of the second embodiment provides different illumination areas so as to compensates for light intensity of a dark area of the road surface located in front of the motorcycle when the motorcycle is inclined relative to the ground at an angle ranging from, e.g., 10 degrees to 50 degrees. In this way, driving safety of the user steering the motorcycle equipped with the steering light device of the present disclosure may be improved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A steering light device adapted to be mounted on one of left and right sides of a motorcycle having an imaginary middle vertical plane that extends horizontally in a front-rear direction, the steering light device comprising:
    a base unit;
    a light emitting unit including a main light source set and at least one elongated auxiliary light source set that are disposed on said base unit and that project light forwardly, said at least one auxiliary light source set including a lower end and a top end, being inclined relative to a horizontal line extending in a left-right direction transverse to the front-rear direction and descending inwardly from said top end toward said lower end; and
    a lens unit including a main lens set that cooperates with said main light source set to project light forwardly to form one of a high beam pattern and a low beam pattern, and at least one auxiliary lens set that is disposed in front of said at least one auxiliary light source set in the front-rear direction, that is connected integrally to said main lens set, that extends forwardly from said auxiliary light source set and that includes a curved light exit face that is disposed at a front end thereof and that is adapted to extend forwardly away from the imaginary middle vertical plane and said auxiliary light source set for compensating light intensity of a dark area in a road surface located in front of the motorcycle when steering the motorcycle to a corresponding one of the left or right;
    wherein said at least one auxiliary lens set includes an upper rim, a lower rim, an inner rim and an outer rim that cooperate with one another to define said light exit face, said upper rim extending forwardly, outwardly and curvedly away from the imaginary middle vertical plane and having an inner upper end that is proximate to the imaginary middle vertical plane in the left-right direction and that is proximate to said at least one auxiliary light source set in the front-rear direction, and an outer upper end that is away from the imaginary middle vertical plane in the left-right direction and that is away from said at least one auxiliary light source set in the front-rear direction, said lower rim extending forwardly and curvedly away from the imaginary middle vertical plane and having an inner lower end that is proximate to the imaginary middle vertical plane in the left-right direction and that is proximate to the auxiliary light source set in the front-rear direction, and an outer lower end that is away from the imaginary middle vertical plane in the left-right direction and that is away from the auxiliary light source set in the front-rear direction, said inner lower end being in front of said inner upper end in the front-rear direction, said outer lower end being behind said outer upper end in the front-rear direction, said inner rim having a curvature greater than that of said outer rim and being disposed behind said outer rim in the front-rear direction.

2. The steering light device as claimed in claim 1, wherein an included angle between said auxiliary light source set and the horizontal direction ranges from 10 degrees to 50 degrees.

3. The steering light device as claimed in claim 1, wherein said main light source set includes two elongate main light sources spaced apart from each other in the left-right direction, each of said main light sources extending in the left-right direction, said at least one steering light source set being disposed under one of said main light sources in a vertical direction transverse to the front-rear direction and the left-right direction.

4. The steering light device as claimed in claim 3, wherein said main lens set includes two main lenses being arranged side-by-side in the left-right direction, integrally connected to each other, and cooperating respectively with said main light sources to project light forwardly, said at least one auxiliary lens set being integrally connected to one of said main lenses that cooperates with the respective one of said main light sources, directly above which said at least one steering light source set is disposed in the third direction.

5. A steering light device adapted to be mounted on one of left and right sides of a motorcycle having an imaginary middle vertical plane that extends horizontally in a front-rear direction, the steering light device comprising:
   a base unit;
   a light emitting unit including a plurality of elongated auxiliary light source sets disposed on said base unit and projecting light, each of said auxiliary light source sets including a lower end and a top end and being inclined relative to a horizontal line extending in a left-right direction transverse to the front-rear direction and descending inwardly from said top end toward said lower end;
   a lens unit including a plurality of auxiliary lens sets that are respectively disposed in front of said auxiliary light source sets in the front-rear direction, each of said auxiliary lens sets extending forwardly away from the respective one of said auxiliary light source sets in the front-rear direction and including a curved light exit face that is disposed at a front end thereof and that is adapted to extend forwardly away from the imaginary middle vertical plane and away from the respective one of said auxiliary light source sets for compensating light intensity of a dark area in a road surface located in front of the motorcycle when steering the motorcycle to a corresponding one of the left or right;
   wherein each of said auxiliary lens sets includes an upper rim, a lower rim, an inner rim and an outer rim cooperate with one another to define said light exit face, for each of said auxiliary lens sets,
   said upper rim extending forwardly, outwardly and curvedly away from the imaginary middle vertical plane and having an inner upper end that is proximate to the imaginary middle vertical plane in the left-right direction and that is proximate to a respective one of said auxiliary light source sets in the front-rear direction, and an outer upper end that is opposite to said inner upper end and that is away from the respective one of said auxiliary light source sets in the left-right direction, said lower rim extending forwardly and curvedly away from the imaginary middle vertical plane and having an inner lower end that is proximate to the imaginary middle vertical plane in the left-right direction, and an outer lower end that is away from the imaginary middle vertical plane in the left-right direction, said inner lower end being in front of said inner upper end in the front-rear direction, said outer lower end being behind said outer upper end in the front-rear direction, said inner rim having a curvature greater than that of said outer rim and being disposed behind said outer rim in the front-rear direction.

6. The steering light device as claimed in claim 5, wherein an included angle between each of said auxiliary light source sets and the horizontal line ranges from 10 degrees to 50 degrees.

7. The steering light device as claimed in claim 5, wherein an included angle between one of said auxiliary light source sets and the horizontal line is 15 degrees, an included angle between another one of said auxiliary light source sets and the horizontal line is 30 degrees, and an included angle between still another one of said auxiliary light source sets and the horizontal line is 45 degrees.

8. The steering light device as claimed in claim 5, wherein each of said auxiliary lens sets includes a rear end surface formed with a recess corresponding in position to a respective one of said auxiliary light source sets in the front-rear direction.

* * * * *